US007312721B2

(12) United States Patent
Mason, Jr. et al.

(10) Patent No.: US 7,312,721 B2
(45) Date of Patent: Dec. 25, 2007

(54) DATA COLLECTOR FOR AN AUTOMATED METER READING SYSTEM

(75) Inventors: Robert T. Mason, Jr., Raleigh, NC (US); Eugene W. Hodges, Holly Springs, NC (US); Kathryn J. Smith, Raleigh, NC (US); Andrew J. Borleske, Raleigh, NC (US)

(73) Assignee: Elster Electricity, LLC, Raleigh, NC (US)

( * ) Notice: Subject to any disclaimer, the term of this patent is extended or adjusted under 35 U.S.C. 154(b) by 293 days.

(21) Appl. No.: 10/953,847

(22) Filed: Sep. 29, 2004

(65) Prior Publication Data
US 2006/0071812 A1 Apr. 6, 2006

Related U.S. Application Data

(63) Continuation of application No. 10/185,664, filed on Jun. 27, 2002, now Pat. No. 7,119,713.

(51) Int. Cl.
*G08C 15/06* (2006.01)
*G08B 23/00* (2006.01)
(52) U.S. Cl. .................. 340/870.02; 340/870.03; 702/61
(58) Field of Classification Search .......... 340/870.01, 340/870.02, 87.03; 702/61
See application file for complete search history.

(56) References Cited

U.S. PATENT DOCUMENTS

| 3,455,815 A | 7/1969 | Saltzberg et al. ........... 340/163 |
| 3,858,212 A | 12/1974 | Tompkins et al. ..... 343/100 CS |
| 3,878,512 A | 4/1975 | Kobayashi et al. ...... 340/168 R |
| 3,973,240 A | 8/1976 | Fong ........................... 340/151 |
| 4,031,513 A | 6/1977 | Simciak ................... 340/152 T |
| 4,056,107 A | 11/1977 | Todd et al. .................... 130/27 |
| 4,066,964 A | 1/1978 | Costanza et al. ............. 325/55 |
| 4,132,981 A | 1/1979 | White ......................... 340/203 |
| 4,190,800 A | 2/1980 | Kelly, Jr. et al. ............. 325/37 |
| 4,204,195 A | 5/1980 | Bogacki ...................... 340/151 |
| 4,218,737 A | 8/1980 | Buscher et al. ............. 364/493 |
| 4,250,489 A | 2/1981 | Dudash et al. .............. 340/147 |
| 4,254,472 A | 3/1981 | Juengel et al. .............. 364/900 |
| 4,319,358 A | 3/1982 | Sepp ............................. 375/1 |
| 4,321,582 A | 3/1982 | Banghart ..................... 340/310 |

(Continued)

FOREIGN PATENT DOCUMENTS

CH 682196 A5 7/1993

(Continued)

OTHER PUBLICATIONS

Chlamtac, I. et al., "Optimizing the System of Virtual Paths", *IEEE ACM Transactions on Networking*, 1994, 2(6), 581-586.
Leung, V.C.M., "Internetworking Wireless Terminals to Local Area Networks Via Radio Bridges", *ICWC*, 1992, 126-129.
Pollini, G.P. et al., "Path Optimization Procedures for Efficient Routing of Information after an Inter-Switch Handover", *IEEE*, 1994, 1-5.

(Continued)

*Primary Examiner*—Timothy Edwards, Jr.
(74) *Attorney, Agent, or Firm*—Woodcock Washburn LLP

(57) ABSTRACT

The invention includes an electronic utility meter, a data collector/meter and a method for communicating data in an automated meter reading system. The inventive method includes communicating data with a network and a first electronic utility meter, and communicating the data with the first electronic utility meter and one or more other meters.

16 Claims, 7 Drawing Sheets

U.S. PATENT DOCUMENTS

| | | | | |
|---|---|---|---|---|
| 4,322,842 A | 3/1982 | Martinez | 370/204 |
| 4,328,581 A | 5/1982 | Harmon et al. | 371/8 |
| 4,361,851 A | 11/1982 | Asip et al. | 358/84 |
| 4,361,890 A | 11/1982 | Green, Jr. et al. | 375/1 |
| 4,396,915 A | 8/1983 | Farnsworth et al. | 340/870.03 |
| 4,405,829 A | 9/1983 | Rivest et al. | 178/22.14 |
| 4,415,896 A | 11/1983 | Allgood | 340/870.03 |
| 4,466,001 A | 8/1984 | Moore et al. | 340/825.08 |
| 4,504,831 A | 3/1985 | Jahr et al. | 340/870.03 |
| 4,506,386 A | 3/1985 | Ichikawa et al. | 455/343 |
| 4,513,415 A | 4/1985 | Martinez | 370/92 |
| 4,525,861 A | 6/1985 | Freeburg | 455/33 |
| 4,600,923 A | 7/1986 | Hicks et al. | 340/870.02 |
| 4,608,699 A | 8/1986 | Batlivala et al. | 375/216 |
| 4,611,333 A | 9/1986 | McCallister et al. | 375/1 |
| 4,614,945 A | 9/1986 | Brunius et al. | 340/870.03 |
| 4,617,566 A | 10/1986 | Diamond | 340/870.11 |
| 4,628,313 A | 12/1986 | Gombrich et al. | 340/870.02 |
| 4,631,538 A | 12/1986 | Carreno | 340/870.18 |
| 4,638,298 A | 1/1987 | Spiro | 340/827 |
| 4,644,321 A | 2/1987 | Kennon | 340/310 |
| 4,653,076 A | 3/1987 | Jerrim et al. | 375/115 |
| 4,672,555 A | 6/1987 | Hart et al. | 700/276 |
| 4,680,704 A | 7/1987 | Konicek et al. | 364/525 |
| 4,688,038 A | 8/1987 | Giammarese | 340/870.02 |
| 4,692,761 A | 9/1987 | Robinton | 340/825 |
| 4,707,852 A | 11/1987 | Jahr et al. | 379/107 |
| 4,713,837 A | 12/1987 | Gordon | 379/93 |
| 4,724,435 A | 2/1988 | Moses et al. | 340/870.13 |
| 4,728,950 A | 3/1988 | Hendrickson et al. | 340/870.31 |
| 4,734,680 A | 3/1988 | Gehman et al. | 340/539 |
| 4,749,992 A | 6/1988 | Fitzmeyer et al. | 340/870.02 |
| 4,757,456 A | 7/1988 | Benghiat | 364/464 |
| 4,769,772 A | 9/1988 | Dwyer | 364/300 |
| 4,783,748 A | 11/1988 | Swarztrauber et al. | 364/483 |
| 4,792,946 A | 12/1988 | Mayo | 370/338 |
| 4,799,059 A | 1/1989 | Grindahl et al. | 340/870.03 |
| 4,804,938 A | 2/1989 | Rouse et al. | 340/310 |
| 4,804,957 A | 2/1989 | Selph et al. | 340/870.03 |
| 4,811,011 A | 3/1989 | Sollinger | 340/870.02 |
| 4,827,514 A | 5/1989 | Ziolko et al. | 380/48 |
| 4,833,618 A | 5/1989 | Verma et al. | 364/483 |
| 4,839,645 A | 6/1989 | Lill | 340/870.17 |
| 4,841,545 A | 6/1989 | Endo et al. | 375/1 |
| 4,860,379 A | 8/1989 | Schoeneberger et al. | 455/5 |
| 4,862,493 A | 8/1989 | Venkataraman et al. | 379/107 |
| 4,868,877 A | 9/1989 | Fischer | 380/25 |
| 4,884,021 A | 11/1989 | Hammond et al. | 324/142 |
| 4,912,722 A | 3/1990 | Carlin | 375/1 |
| 4,922,518 A | 5/1990 | Gordon et al. | 379/57 |
| 4,939,726 A | 7/1990 | Flammer et al. | 370/94.1 |
| 4,940,974 A | 7/1990 | Sojka | 340/825.08 |
| 4,940,976 A | 7/1990 | Gastouniotis et al. | 340/870.02 |
| 4,958,359 A | 9/1990 | Kato | 375/1 |
| 4,964,138 A | 10/1990 | Nease et al. | 375/1 |
| 4,965,533 A | 10/1990 | Gilmore | 331/18 |
| 4,972,507 A | 11/1990 | Lusignan | 455/51 |
| 5,007,052 A | 4/1991 | Flammer | 370/85.6 |
| 5,018,165 A | 5/1991 | Sohner et al. | 375/1 |
| 5,022,046 A | 6/1991 | Morrow, Jr. | 375/1 |
| 5,032,833 A | 7/1991 | Laporte | 340/825.02 |
| 5,053,766 A | 10/1991 | Ruiz-del-Portal et al. | 340/870.02 |
| 5,053,774 A | 10/1991 | Schuermann et al. | 342/44 |
| 5,056,107 A | 10/1991 | Johnson et al. | 375/1 |
| 5,067,136 A | 11/1991 | Arthur et al. | 375/1 |
| 5,079,715 A | 1/1992 | Venkataraman et al. | 364/481 |
| 5,079,768 A | 1/1992 | Flammer | 370/94.1 |
| 5,086,292 A | 2/1992 | Johnson et al. | 340/637 |
| 5,086,385 A | 2/1992 | Launey | 364/188 |
| 5,090,024 A | 2/1992 | Vander Mey et al. | 375/1 |
| 5,111,479 A | 5/1992 | Akazawa | 375/1 |
| 5,115,433 A | 5/1992 | Baran et al. | 370/94.3 |
| 5,115,448 A | 5/1992 | Mori | 375/1 |
| 5,129,096 A | 7/1992 | Burns | 455/18 |
| 5,130,987 A | 7/1992 | Flammer | 370/103 |
| 5,132,985 A | 7/1992 | Hashimoto et al. | 375/1 |
| 5,136,614 A | 8/1992 | Hiramatsu et al. | 375/1 |
| 5,142,694 A | 8/1992 | Jackson et al. | 455/67.1 |
| 5,151,866 A | 9/1992 | Glaser et al. | 364/483 |
| 5,155,481 A | 10/1992 | Brennan, Jr. et al. | 340/870.02 |
| 5,160,926 A | 11/1992 | Schweitzer, III | 340/870.02 |
| 5,166,664 A | 11/1992 | Fish | 340/539 |
| 5,177,767 A | 1/1993 | Kato | 375/1 |
| 5,179,376 A | 1/1993 | Pomatto | 340/870.02 |
| 5,189,694 A | 2/1993 | Garland | 379/106 |
| 5,194,860 A | 3/1993 | Jones et al. | 340/870.02 |
| 5,197,095 A | 3/1993 | Bonnet | 379/107 |
| 5,204,877 A | 4/1993 | Endo et al. | 375/1 |
| 5,214,587 A | 5/1993 | Green | 364/464.04 |
| 5,225,994 A | 7/1993 | Arinobu et al. | 364/492 |
| 5,228,029 A | 7/1993 | Kotzin | 370/95.1 |
| 5,229,996 A | 7/1993 | Bäckström et al. | 370/100.01 |
| 5,239,575 A | 8/1993 | White et al. | 379/107 |
| 5,239,584 A | 8/1993 | Hershey et al. | 380/28 |
| 5,243,338 A | 9/1993 | Brennan, Jr. et al. | 340/870.02 |
| 5,252,967 A | 10/1993 | Brennan et al. | 340/870.02 |
| 5,260,943 A | 11/1993 | Comroe et al. | 370/95.1 |
| 5,270,704 A | 12/1993 | Sosa Quintana et al. | 340/870.02 |
| 5,280,498 A | 1/1994 | Tymes et al. | 375/1 |
| 5,280,499 A | 1/1994 | Suzuki | 375/1 |
| 5,285,469 A | 2/1994 | Vanderpool | 375/1 |
| 5,287,287 A | 2/1994 | Chamberlain et al. | 364/483 |
| 5,289,497 A | 2/1994 | Jacobson et al. | 375/1 |
| 5,295,154 A | 3/1994 | Meier et al. | 375/1 |
| 5,307,349 A | 4/1994 | Shloss et al. | 370/85.2 |
| 5,311,541 A | 5/1994 | Sanderford, Jr. | 375/1 |
| 5,311,542 A | 5/1994 | Eder | 375/1 |
| 5,315,531 A | 5/1994 | Oravetz et al. | 364/550 |
| 5,319,679 A | 6/1994 | Bagby | 375/106 |
| 5,329,547 A | 7/1994 | Ling | 375/1 |
| 5,345,225 A | 9/1994 | Davis | 340/635 |
| 5,359,625 A | 10/1994 | Vander Mey et al. | 375/1 |
| 5,377,222 A | 12/1994 | Sanderford, Jr. | 375/1 |
| 5,381,462 A | 1/1995 | Larson et al. | 379/107 |
| 5,383,134 A | 1/1995 | Wrzesinski | 364/514 |
| 5,384,712 A | 1/1995 | Oravetz et al. | 364/550 |
| 5,387,873 A | 2/1995 | Muller et al. | 327/155 |
| 5,390,360 A | 2/1995 | Scop et al. | 455/34.2 |
| 5,406,495 A | 4/1995 | Hill | 364/483 |
| 5,416,917 A | 5/1995 | Adair et al. | 395/500 |
| 5,420,799 A | 5/1995 | Peterson et al. | 364/483 |
| 5,428,636 A | 6/1995 | Meier | 375/202 |
| 5,430,759 A | 7/1995 | Yokev et al. | 375/202 |
| 5,432,507 A | 7/1995 | Mussino et al. | 340/870.03 |
| 5,432,815 A | 7/1995 | Kang et al. | 375/200 |
| 5,438,329 A | 8/1995 | Gastouniotis et al. | 340/870.02 |
| 5,448,230 A | 9/1995 | Schanker et al. | 340/870.03 |
| 5,448,570 A | 9/1995 | Toda et al. | 370/95.3 |
| 5,450,088 A | 9/1995 | Meier et al. | 342/51 |
| 5,452,465 A | 9/1995 | Geller et al. | 395/800 |
| 5,455,533 A | 10/1995 | Köllner | 327/484 |
| 5,455,544 A | 10/1995 | Kechkaylo | 332/103 |
| 5,455,569 A | 10/1995 | Sherman et al. | 340/825.02 |
| 5,455,822 A | 10/1995 | Dixon et al. | 370/18 |
| 5,457,713 A | 10/1995 | Sanderford, Jr. et al. | 375/206 |
| 5,461,558 A | 10/1995 | Patsiokas et al. | 364/145 |
| 5,463,657 A | 10/1995 | Rice | 375/200 |
| 5,473,322 A | 12/1995 | Carney | 340/870.02 |
| 5,475,742 A | 12/1995 | Gilbert | 379/106 |
| 5,475,867 A | 12/1995 | Blum | 455/53.1 |
| 5,479,442 A | 12/1995 | Yamamoto | 375/206 |
| 5,481,259 A | 1/1996 | Bane | 340/870.03 |

| Patent | Type | Date | Inventor | Class |
|---|---|---|---|---|
| 5,488,608 | A | 1/1996 | Flammer, III | 370/85.13 |
| 5,491,473 | A | 2/1996 | Gilbert | 340/870.01 |
| 5,493,287 | A | 2/1996 | Ane | 340/825.52 |
| 5,495,239 | A | 2/1996 | Ouellette | 340/870.02 |
| 5,497,424 | A | 3/1996 | Vanderpool | 380/34 |
| 5,499,243 | A | 3/1996 | Hall | 370/85.8 |
| 5,500,871 | A | 3/1996 | Kato et al. | 375/208 |
| 5,511,188 | A | 4/1996 | Pascucci et al. | 395/600 |
| 5,519,388 | A | 5/1996 | Adair, Jr. | 340/870.02 |
| 5,521,910 | A | 5/1996 | Matthews | 370/54 |
| 5,522,044 | A | 5/1996 | Pascucci et al. | 395/200.06 |
| 4,749,992 | A | 6/1996 | Fitzmeyer et al. | 340/870.02 |
| 5,524,280 | A | 6/1996 | Douthitt et al. | 455/62 |
| 5,525,898 | A | 6/1996 | Lee, Jr. et al. | 324/142 |
| 5,526,389 | A | 6/1996 | Buell et al. | 375/200 |
| 5,528,507 | A | 6/1996 | McNamara et al. | 364/483 |
| 5,528,597 | A | 6/1996 | Gerszberg et al. | 370/95.3 |
| 5,539,775 | A | 7/1996 | Tuttle et al. | 375/200 |
| 5,541,589 | A | 7/1996 | Delaney | 340/870.02 |
| 5,544,036 | A | 8/1996 | Brown, Jr. et al. | 364/145 |
| 5,546,424 | A | 8/1996 | Miyake | 375/206 |
| 5,548,527 | A | 8/1996 | Hemminger et al. | 364/492 |
| 5,548,633 | A | 8/1996 | Kujawa et al. | 379/93 |
| 5,553,094 | A | 9/1996 | Johnson et al. | 375/200 |
| 5,555,508 | A | 9/1996 | Munday et al. | 364/492 |
| 5,559,870 | A | 9/1996 | Patton et al. | 379/107 |
| 5,566,332 | A | 10/1996 | Adair et al. | 395/600 |
| 5,570,084 | A | 10/1996 | Ritter et al. | 340/825.05 |
| 5,572,438 | A | 11/1996 | Ehlers et al. | 364/492 |
| 5,574,657 | A | 11/1996 | Tofte et al. | 364/510 |
| 5,590,179 | A | 12/1996 | Shincovich et al. | 379/107 |
| 5,592,470 | A | 1/1997 | Rudrapatna et al. | 370/320 |
| 5,594,740 | A | 1/1997 | LaDue | 379/59 |
| 5,602,744 | A | 2/1997 | Meek et al. | 364/464.22 |
| 5,617,084 | A | 4/1997 | Sears | 331/176 |
| 5,619,192 | A | 4/1997 | Ayala | 340/870.02 |
| 5,619,685 | A | 4/1997 | Schiavone | 395/500 |
| 5,621,629 | A | 4/1997 | Hemminer et al. | 363/56 |
| 5,627,759 | A | 5/1997 | Bearden et al. | 364/483 |
| 5,631,636 | A | 5/1997 | Bane | 340/825.69 |
| 5,636,216 | A | 6/1997 | Fox et al. | 370/402 |
| 5,640,679 | A | 6/1997 | Lundqvist et al. | 455/33.2 |
| 5,659,300 | A | 8/1997 | Dresselhuys et al. | 340/870.02 |
| 5,668,803 | A | 9/1997 | Tymes et al. | 370/312 |
| 5,668,828 | A | 9/1997 | Sanderford, Jr. et al. | 375/202 |
| 5,673,252 | A | 9/1997 | Johnson et al. | 370/449 |
| 5,684,472 | A | 11/1997 | Bane | 340/870.02 |
| 5,684,799 | A | 11/1997 | Bigham et al. | 370/397 |
| 5,691,715 | A | 11/1997 | Ouellette | 340/870.09 |
| 5,692,180 | A | 11/1997 | Lee | 395/610 |
| 5,696,501 | A | 12/1997 | Ouellette et al. | 340/870.02 |
| 5,696,765 | A | 12/1997 | Safadi | 370/436 |
| 5,696,903 | A | 12/1997 | Mahany | 395/200.85 |
| 5,699,276 | A | 12/1997 | Roos | 364/514 A |
| 5,714,931 | A | 2/1998 | Petite et al. | 340/539 |
| 5,715,390 | A | 2/1998 | Hoffman et al. | 395/188.01 |
| 5,717,604 | A | 2/1998 | Wiggins | 364/514 C |
| 5,719,564 | A | 2/1998 | Sears | 340/870.02 |
| 5,732,078 | A | 3/1998 | Arango | 370/355 |
| 5,745,901 | A | 4/1998 | Entner et al. | 707/103 |
| 5,748,104 | A | 5/1998 | Argyroudis et al. | 340/870.11 |
| 5,748,619 | A | 5/1998 | Meier | 370/278 |
| 5,751,914 | A | 5/1998 | Coley et al. | 395/51 |
| 5,751,961 | A | 5/1998 | Smyk | 395/200.47 |
| 5,754,772 | A | 5/1998 | Leaf | 395/200.33 |
| 5,754,830 | A | 5/1998 | Butts et al. | 395/500 |
| 5,757,783 | A | 5/1998 | Eng et al. | 370/315 |
| 5,768,148 | A | 6/1998 | Murphy et al. | 364/492 |
| 5,778,368 | A | 7/1998 | Hogan et al. | 707/10 |
| 5,787,437 | A | 7/1998 | Potterveld et al. | 707/103 |
| 5,790,789 | A | 8/1998 | Suarez | 395/200.32 |
| 5,790,809 | A | 8/1998 | Holmes | 395/200.58 |
| 5,801,643 | A | 9/1998 | Williams et al. | 340/870.02 |
| 5,805,712 | A | 9/1998 | Davis | 380/50 |
| 5,808,558 | A | 9/1998 | Meek et al. | 340/870.01 |
| 5,809,059 | A | 9/1998 | Souissi et al. | 375/202 |
| 5,822,521 | A | 10/1998 | Gartner et al. | 395/200.6 |
| 5,850,187 | A | 12/1998 | Carrender et al. | 340/10.42 |
| 5,862,391 | A | 1/1999 | Salas et al. | 395/750.01 |
| 5,872,774 | A | 2/1999 | Wheatley, III et al. | 370/335 |
| 5,874,903 | A | 2/1999 | Shuey et al. | 340/870.02 |
| 5,875,183 | A | 2/1999 | Nitadori | 370/328 |
| 5,875,402 | A | 2/1999 | Yamawaki | 455/502 |
| 5,884,184 | A | 3/1999 | Sheffer | 455/521 |
| 5,892,758 | A | 4/1999 | Argyroudis | 370/335 |
| 5,896,382 | A | 4/1999 | Davis et al. | 370/401 |
| 5,897,607 | A | 4/1999 | Jenney et al. | 702/62 |
| 5,898,387 | A | 4/1999 | Davis et al. | 340/870.02 |
| 5,907,491 | A | 5/1999 | Canada et al. | 364/468.15 |
| 5,907,540 | A | 5/1999 | Hayashi | 370/315 |
| 5,910,799 | A | 6/1999 | Carpenter et al. | 345/333 |
| 5,923,269 | A | 7/1999 | Shuey et al. | 340/870.02 |
| 5,926,103 | A | 7/1999 | Petite | 340/825.19 |
| 5,926,531 | A | 7/1999 | Petite | 379/144 |
| 5,943,375 | A | 8/1999 | Veintimilla | 375/355 |
| 5,944,842 | A | 8/1999 | Propp et al. | 714/701 |
| 5,953,319 | A | 9/1999 | Dutta et al. | 370/238 |
| 5,959,550 | A | 9/1999 | Giles | 340/870.02 |
| 5,960,074 | A | 9/1999 | Clark | 379/310 |
| 5,963,146 | A | 10/1999 | Johnson et al. | 340/870.1 |
| 5,974,236 | A | 10/1999 | Sherman | 395/200.51 |
| 5,986,574 | A | 11/1999 | Colton | 340/870.02 |
| 6,000,034 | A | 12/1999 | Lightbody et al. | 713/202 |
| 6,028,522 | A | 2/2000 | Petite | 340/641 |
| 6,034,988 | A | 3/2000 | VanderMey et al. | 375/202 |
| 6,035,201 | A | 3/2000 | Whitehead | 455/455 |
| 6,041,056 | A | 3/2000 | Bigham et al. | 370/395 |
| 6,061,604 | A | 5/2000 | Russ et al. | 700/90 |
| 6,067,029 | A | 5/2000 | Durston | 340/870.03 |
| 6,073,169 | A | 6/2000 | Shuey et al. | 709/217 |
| 6,073,174 | A | 6/2000 | Montgomerie et al. | 709/224 |
| 6,078,251 | A | 6/2000 | Landt et al. | 340/10.41 |
| 6,078,785 | A | 6/2000 | Bush | 455/7 |
| 6,078,909 | A | 6/2000 | Knutson | 705/59 |
| 6,088,659 | A | 7/2000 | Kelley et al. | 702/62 |
| 6,091,758 | A | 7/2000 | Ciccone et al. | 375/132 |
| 6,100,817 | A | 8/2000 | Mason, Jr. et al. | 340/870.02 |
| 6,112,192 | A | 8/2000 | Capek | 705/59 |
| 6,124,806 | A | 9/2000 | Cunningham et al. | 340/870.02 |
| 6,128,276 | A | 10/2000 | Agee | 370/288 |
| 6,137,423 | A | 10/2000 | Glorioso et al. | 340/870.02 |
| 6,150,955 | A | 11/2000 | Tracy et al. | 340/870.02 |
| 6,154,487 | A | 11/2000 | Murai et al. | 375/150 |
| 6,160,993 | A | 12/2000 | Wilson | 455/12.1 |
| 6,172,616 | B1 | 1/2001 | Johnson et al. | 340/870.12 |
| 6,195,018 | B1* | 2/2001 | Ragle et al. | 340/870.01 |
| 6,199,068 | B1 | 3/2001 | Carpenter | 707/100 |
| 6,208,266 | B1 | 3/2001 | Lyons et al. | 340/870.02 |
| 6,218,953 | B1 | 4/2001 | Petite | 340/641 |
| 6,233,327 | B1 | 5/2001 | Petite | 379/155 |
| 6,246,677 | B1* | 6/2001 | Nap et al. | 370/346 |
| 6,249,516 | B1 | 6/2001 | Brownrigg et al. | 370/338 |
| 6,333,975 | B1 | 12/2001 | Brunn et al. | 379/106.03 |
| 6,363,057 | B1 | 3/2002 | Ardalan et al. | 370/252 |
| 6,393,341 | B1 | 5/2002 | Lawrence et al. | 700/286 |
| 6,396,839 | B1 | 5/2002 | Ardalan et al. | 370/401 |
| 6,421,731 | B1 | 7/2002 | Ciotti, Jr. et al. | 709/238 |
| 6,430,268 | B1 | 8/2002 | Petite | 379/39 |
| 6,437,692 | B1 | 8/2002 | Petite et al. | 340/540 |
| 6,446,192 | B1 | 9/2002 | Narasimhan et al. | 712/29 |
| 6,643,278 | B1 | 11/2003 | Panasik et al. | 370/330 |
| 6,657,549 | B1 | 12/2003 | Avery | 340/825.49 |
| 6,684,245 | B1 | 1/2004 | Shuey et al. | 709/223 |
| 6,751,563 | B2 | 6/2004 | Spanier et al. | 702/61 |
| 6,867,707 | B1 | 3/2005 | Kelley et al. | 340/870.02 |
| 7,176,807 | B2* | 2/2007 | Scoggins et al. | 340/870.02 |

| | | | |
|---|---|---|---|
| 2001/0002210 A1 | 5/2001 | Petite | 379/155 |
| 2001/0024163 A1 | 9/2001 | Petite | 340/628 |
| 2002/0012323 A1 | 1/2002 | Petite et al. | 370/252 |
| 2002/0013679 A1 | 1/2002 | Petite | 702/188 |
| 2002/0019712 A1 | 2/2002 | Petite et al. | 702/61 |
| 2002/0019725 A1 | 2/2002 | Petite | 702/188 |
| 2002/0026957 A1 | 3/2002 | Reyman | 137/39 |
| 2002/0027504 A1 | 3/2002 | Davis et al. | 340/540 |
| 2002/0031101 A1 | 3/2002 | Petite et al. | 370/310 |
| 2002/0094799 A1 | 7/2002 | Elliott et al. | 455/405 |
| 2002/0125998 A1 | 9/2002 | Petite et al. | 340/286.01 |
| 2002/0145537 A1 | 10/2002 | Mueller et al. | 340/870.02 |
| 2002/0169643 A1 | 11/2002 | Petite et al. | 705/5 |
| 2003/0036810 A1 | 2/2003 | Petite | 700/9 |
| 2003/0036822 A1 | 2/2003 | Davis et al. | 700/295 |
| 2003/0123442 A1 | 7/2003 | Drucker et al. | 370/392 |
| 2003/0202512 A1 | 10/2003 | Kennedy | 370/389 |
| 2004/0113810 A1 | 6/2004 | Mason, Jr. et al. | 340/870.02 |
| 2005/0068194 A1* | 3/2005 | Schleich et al. | 340/870.02 |
| 2005/0184881 A1 | 8/2005 | Dusenberry et al. | 340/870.02 |
| 2005/0270173 A1 | 12/2005 | Boaz | 340/870.02 |

FOREIGN PATENT DOCUMENTS

| | | |
|---|---|---|
| EP | 0 395 495 A1 | 10/1990 |
| EP | 0 446 979 A1 | 9/1991 |
| EP | 0 629 098 A2 | 12/1994 |
| GB | 2 118 340 A | 10/1983 |
| GB | 2 157 448 A | 10/1985 |
| GB | 2 186 404 A | 8/1987 |
| GB | 02 222 898 A | 3/1990 |
| GB | 2 237 910 A | 5/1991 |
| JP | 4290593 A | 10/1992 |
| JP | 05-260569 | 10/1993 |
| JP | 8194023 A | 7/1996 |
| WO | 93/02515 A1 | 2/1993 |
| WO | 93/04451 A1 | 3/1993 |
| WO | 95/32595 A1 | 11/1995 |
| WO | 96/10856 A1 | 4/1996 |

OTHER PUBLICATIONS

Rajagopalan, B. et al., "A New Responsive Distributed Shortest-Path Routing Algorithm", *ACM*, 1989, 237-246.

Desbonnet, Joe et al., "System Architecture and Implementation of CEBus/Internet Gateway", *IEEE*, 1997, 1057-1062.

Markwalter, Brian et al., "CEBus Network Layer Description", *IEEE*, 1989, 571-575.

Newtown, Harry, *Newtown's Telecom Dictionary*, Flatiron Publishing, Inc., 10th Ed., 1996, LAN (1 of 1): Cebus Overview (1-3): Cebus Industry Council (1 of 1).

Newtown, Harry, *Newtown's Telecom Dictionary*, 10th Edition, 1996, 243.

International Search Report issued in International Application No. PCT/US98/11170 Date of Mailing: Oct. 7, 1998.

International Search Report issued in International Application No. PCT/US98/19034 Date of Mailing: Feb. 1, 1999.

Internet Printout, http://www.ram.com BellSouth Wireless Data—Paging, Mobitex, Network, Business, Sep. 23, 1998: — MOBITEX®: The Heart of Every BellSouth Solution —Mobitex Features and Services: RAM Mobile Data White Paper, Feb. 1997 — Narrowband PCS Technologies: What are the Options?: RAM Mobile Data White Paper, Nov. 1997 —The Inherent Security of Data Over Mobitex Wireless Packet Data Networks, A RAM Mobile Data White Paper, Oct. 1995—Comparative Analysis of Coverage and Performance: RAM & Ardis, 1998.

Internet Printout, http://www.ardis.com "Ardis Two-Way, Wireless Data Communications," ARDIS, Sep. 23, 1998.

Internet Printout, http://ww.ardis.com/RADIO "An Overview of Radio Coverage," Sep. 29, 1998 "Radio Propagation," Sep. 29, 1998 "Factors Affecting ARDIS Coverage," Sep. 29, 1998 "The ARDIS Network Compared to Other Systems," Sep. 29, 1998.

Internet Printout, http://www.ardis.com/RADIO "Radio Coverage," Sep. 29, 1998 "Glossary of Terms," Sep. 29, 1998 "Radio Propagation in Free Space," Sep. 29, 1998 "Real World Propagation Variations," Sep. 29, 1998 "Probability of Reception vs. Calculation," Sep. 29, 1998.

Rappaport, T. S., "Wireless Communications, Principles and Practice," Prentice Hall PTR, 1996, pp. 410-413.

Brochure: TRF6900 Single-Chip RF Transceiver, Texas Instrument, 2001 ©.

Corcoran, P.M. et al., "CEBus Network Access via the World-Wide-Web", *International Conference on Consumer Electronics*, Jun. 5-7, 1996, 236-237, XP-002218722.

Corcoran, P.M. et al., "Browser-Style Interfaces to a Home Automation Network", *IEEE Trans. On Consumer Electronics*, Nov. 1, 1997, 43(4), 1063-1069, XP-000768559.

Norenkov, et al., *Telecommunication Technologies and Networks, Moscow Bauman Technical School*, 1988, (Signed for publication on Dec. 10, 1997), pp. 116-118, 80-87 [1] English Language Abstract Provided.

Brownrigg, E. Ph.D., "Developing the Information Superhighway Issues for Libraries", *Library Perspectives on NREN*, The National Research and Education Network, 1990, 55-63.

Brownrigg, E.B., "The Internet as an External Economy: The Emergence of the Invisible Hand", *Library Administration and Management*, 1991, 95-97.

Frankel, M.S., "Packet Radios Provide Link for Distributed, Survivable C3 in Post-Attack Scenarios", *MSN*, Jun. 1983, 80-108.

Gower, N. et al., "Congestion Control Using Pacing in a Packet Radio Network", *IEEE Military Communications Conference*, 1982, 1, 23.1-1, 23-1-6.

Johnson, D.B., "Routing in Ad Hoc Networks of Mobile Hosts", *IEEE*, 1995, 158-163.

Jubin, J., "Current Packet Radio Networks Protocols", *IEEE Infocom Proceedings*, 1985, 86-92.

Jubin, J. et al., "The DARPA Packet Radio Network Protocols", *Proceedings of the IEEE*, 1987, 75(1), 21-32.

Kahn, R.E., "The Organization of Computer Resources into a Packet Radio Network", *IEEE Transactions on Communications*, 1977, 25(1), 169-178.

Kahn, R.E., et al., "Advances in Packet Radio Technology", *proceedings of the IEEE*, 1978, 66(11), 1468-1496.

Lauer, G. et al., "Survivable Protocols for Large Scale Packet Radio Networks", *IEEE Global Telecommunications Conference*, 1984, 468-471.

Lynch, C.A. et al., "Electronic Publishing, Electronic Imaging, and Document Delivery", *Electronic Imaging, International Electronic Imaging Exposition & Conference*, 1986, 662-667.

Lynch, C.A. et al., "The Telecommunications Landscape", 1986, 7 pages.

Lynch, C.A. et al., "Routing, Repeating, Power Control and Directional Techniques", *Packet Radio Networks*, Architectures, Protocols, Technologies and Applications, 1987, Ch 5, 105-129, 259-274.

MacGregor, W. et al., "Multiple Control Stations in Packet Radio Networks", *IEEE Military Communications Conference*, 1982, 10.3-1-10.3-5.

Shachan, N. et al., "A Packet Radio Network for Library Automation", *IEEE Military Communications Conference*, 1987, 2, 21.3.1-21.3.7.

Shacham, N. et al., "Future Directions in Packet Radio Technology", *IEEE Infocom Proceedings*, 1985, 93-98.

Westcott, J.A., "Issues in Distributed Routing for Mobile Packet Radio Networks", *IEEE*, 1982, 233-238.

Wescott, J. et al., "A Distributed Routing Design for a Broadcast Environment", *IEEE Military Communications Conference*, 1982, 10.4-1-10.4-5.

"Packet Radio: Applications for Libraries in Developing Countries", *UDT Series on Data Communication Technologies and Standards for Libraries*, 1993, Ch 1-6, 87 pages.

* cited by examiner

| Field Name | Size (bytes) | Description |
|---|---|---|
| CurrentIntervalIndex | 1 | Pointer to the current interval in IntervalData |
| IntervalData | 13*4 | 13 intervals, one such interval is shown in the shaded rows. |
| Status | 2 | b0-10: Timestamp - Time at the beginning of the interval (32 second resolution) <br> b11: PowerInterruption - Set if power failed during the interval <br> b12: TimeChanged - Set if time was changed during the interval <br> b13: LongInterval - Set if interval is long (i.e. time change backwards in same interval) <br> b14: ShortInterval - Set if the interval is short (i.e. time change forwards in same interval) <br> b15: TimeInvalid - Set if the meter does not know the time. This is true after a meter power failure. |
| Data | 2 | UINT16. Wh pulses during the interval. |

Figure 4

DATA COLLECTOR FOR AN AUTOMATED METER READING SYSTEM

CROSS-REFERENCE TO RELATED APPLICATIONS

The present application is related to U.S. patent application Ser. No. 10/185,664, filed Jun. 27, 2002, and entitled "Dynamic Self-Configuring Metering Network," now U.S. Pat. No. 7,119,713, which is incorporated herein by reference.

TECHNICAL FIELD

The invention relates to the field of service meters. More specifically, the invention relates to a data collector for an automated meter reading system.

BACKGROUND OF THE INVENTION

Since its infancy, the electric power industry has used electromechanical meters to capture power usage. Similarly, electromechanical meters have been used for water and gas usage. In the context of electric power meters, the electromechanical meters collected little more than total power usage. Also, the electric power meters required human meter readers to travel to the millions of customer premises in order to read the usage totals captured by the meters. Over time, electromechanical meters began to be replaced by electronic meters.

Electronic meters have computer processing components that allow the meters to capture more data in an intelligent way. For example, today's meters are able to ascertain periodic usage (e.g., which time of day is more power used) or demand determinations (e.g., the peak power), power quality, and power factor considerations. In addition to capturing more data, electronic meters also are able to communicate the more detailed data to the utility over telephone lines or over wireless networks. In fact, the communication sophistication of today's meters is nearly limitless. For example, today's high cost meters are able to communicate directly with a utility's central computing system over fixed communication networks.

Although fixed network provide a sophistication and reliable communication network, they also require a complex and costly infrastructure. For example, a fixed wireless communication system often requires the installation of pole or roof mounted repeaters or gateways. Such equipment, while important to the reliability of the communication system, creates additional equipment and installation efforts. In addition, the fixed wireless communication systems require a higher cost meter so as to communicate directly with the utility's central server. As a result, AMR (Automated Meter Reading) systems that rely on the sophisticated meters and fixed wireless networks have become cost prohibitive.

Therefore, there is a need to employ more low cost electronic meters, while maintaining the communication and networking capabilities of today's AMR systems.

SUMMARY OF THE INVENTION

The invention includes an electronic utility meter, a data collector/meter and a method for communicating data in an automated meter reading system. The inventive method includes communicating data with a network and a first electronic utility meter, and communicating the data with the first electronic utility meter and one or more other meters.

The inventive data collector/meter includes a first port for communicating data with one or more other electronic meters, a second port for communicating data with a network, and a transceiver in communication with the first port and the second port. The transceiver communicates data between the other electronic meter and the computer. Also, the inventive device includes a computer in communication with the transceiver. The electronic utility meter may be a gas meter, a water meter, or an electric power meter. Also, the network may include a central computer at a utility in communication with a billing system. The data may be communicated as a function of predetermined criteria that filters the data provided by the electronic utility meter to the other meters. The transceiver routes the data from the network to the other meters. The meter may include a data storage device for data received from the other meters and from the network. The data storage device may provide the stored data to the network when requested by the network, and may provide the stored data to the other meters when requested by the network. Also, the computer may provide timing data to the other meters, where the timing data is transmitted to the other meters at a substantially similar time and/or at different times. The data comprises at least one of the following: time-of-use data and demand data. The communication between the electronic utility meter and the other meters may be accomplished via wireless and/or wired techniques. Similarly, the communication between the electronic utility meter and the network may be accomplished via wireless and/or wired techniques. The communication between the electronic utility meter and the other meters is accomplished using at least one of the following techniques: TCP/IP, Internet, electronic messaging, XML, digital encryption, digital signature, Ethernet, DSL, Cable Modem, 802.11, Bluetooth, and X10, for example. Also, the meter may receive a query from a customer premise to the electronic utility meter via the other meter. The meter may communicate a demand reset request from the electronic utility to the other meters at a predetermined interval, where the predetermined interval is at least one of the following: a billing change date, and a season change date.

BRIEF DESCRIPTION OF THE DRAWINGS

Other features of the invention are further apparent from the following detailed description of the embodiments of the invention taken in conjunction with the accompanying drawings, of which:

FIG. 4 provides an example of a load profile table, according to the invention;

DETAILED DESCRIPTION OF THE INVENTION

Automated Meter Reading System

Figure 1:
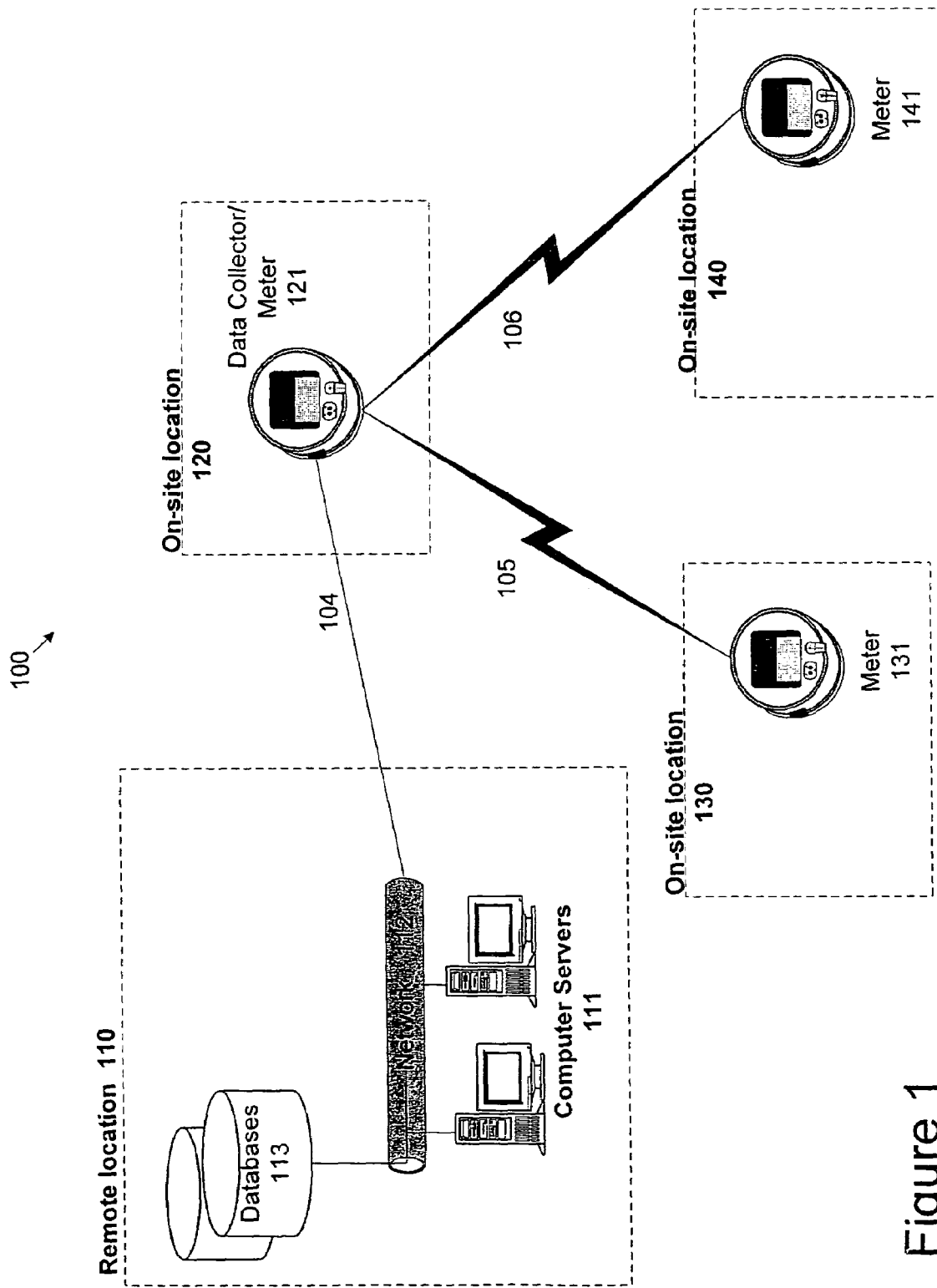
FIG. 1 is a block diagram of an automated meter reading system, according to the invention.

FIG. 1 is a block diagram of an automated meter reading system 100 for processing data that is captured by an electric power meter. Although FIG. 1 is discussed with reference to an electric power meter, it should be appreciated that the invention applies equally to other meters and other systems. For example, FIG. 1 also may have been described in the context of a gas meter system, or a water meter system, or other similar system. Accordingly, the invention is not limited by the example embodiment described with reference to FIG. 1.

System 100 includes a remote location 110 in communication with an on-site location 120. On-site location 120 also is in communication with on-site locations 130 and 140. Remote location 110 includes equipment capable of processing and centrally serving AMR system 100. In particular, remote location 110 may include computer servers 111 in communication with a network 112, which is further in communication with databases 113. Although other components may be included at remote location 110, the components depicted in FIG. 1 have been shown for the purposes of clarity and brevity. Generally, remote location 110 may be located within a utility's organization, and may be capable of processing the usage data collected at on-site locations 120, 130 and 140. As such, remote location may include equipment capable of providing information related to billing for the use of electric power at on-site locations 120, 130 and 140.

On-site location 130 includes a meter 131 and on-site location 140 includes a meter 141. Meters 131 and 141 collect electrical power usage at on-site locations 130 and 140, respectively. For example, on-site locations 130 and 140 may be residential customer premise locations, and meters 131 and 141 may collect the electrical power used by the customer premises. Meters 131 and 141 may be single phase or three phase electrical or electronic meters. For example, meters 131 and 141 may be an A3 Alpha meter modified to communicate with data collector/meter 121 wirelessly or otherwise (e.g., 900 MHz radio) and manufactured by ABB Inc. Although just two meters are shown in FIG. 1, it should be appreciated that any number of meters may be in communication with data collector/meter 121. Also, although just one data collector/meter 121 is shown in FIG. 1, it should be appreciated that there may be any number of such collectors in communication with remote location 110. Furthermore, although the description focuses on the interaction with meter 131, it should be understood that all such discussion applies equally to meter 141, or any other meters in communication with data collector/meter 121.

Data collector/meter 121 may be responsible for reading and storing billing data from meter 131 and similar meters. As is described in detail U.S. patent application Ser. No. 10/185,664 filed Jun. 27, 2002, and entitled "Dynamic Self-Configuring Metering Network," now U.S. Pat. No. 7,119,713, which is incorporated herein by reference, meter 131 registers with collector 121. Once meter 131 is registered to collector 121, collector 121 may then be responsible for reading current billing data from meter 131 and storing the billing data in a database (not shown) located within data collector/meter 121. Such data reads may be accomplished intermittently, continually (e.g., every 4 hours), or as a function of available network resources (e.g., during minimum data traffic times).

Data collector/meter 121 also may be responsible for knowing the billing date for meter 131. Data collector/meter 121 may then notify meter 131 as to when to store a copy of the current billing data and when to reset or clear its data. For example, data collector/meter 121 may notify meter 131 to store a copy of its billing data at midnight of the billing date. Data collector/meter 131 may then notify meter 131 to conduct a reset demand and to start the next billing cycle. When data collector/meter 121 reads the data on the particular billing date, the data is stored within data collector/meter 121. For example, data collector/meter 121 may store the data in a storage device called "Previous Billing Data Table" located in data collector/meter 121. Data collector/meter 121 also may be responsible for notifying meter 131 of a particular TOU (time of use) schedule to be used by meter 131 and of notifying meter 131 of any TOU season changes. Season change dates are similar to billing dates in that data collector/meter 121 notifies meter 131 to store a copy of the current data, and to conduct a reset demand. Data collector/meter 121 may then read this season change copy of data and store it in a data location within data collector/meter 121 called "Previous Season Data Table."

As meters 131 and 141 collect electric power usage data, the data may be stored within meters 131 and 141, and/or may be communicated with data collector/meter 121 at on-site location 120. As will be discussed in greater detail, the communication of the data from meters 131 and 141 to data collector/meter 121 may be accomplished immediately, or after some predetermined time period depending upon certain circumstances like the type of data to be communicated, the availability of the communication link, the time of day, and the time of year, etc.

Data may be communicated between meter 131 and data collector/meter 121 over communication link 105. Similarly, data may be communicated between meter 141 and data collector/meter 121 over communication link 106. Data provided to and collected at data collector/meter 121 from meters 131 and 141 may then be provided to remote location 110 over communication link 104. Also, although not shown with reference to FIG. 2, it should be appreciated that meter 131 and meter 141 may communicate directly with one another, and that data collector/meter 121 may communicate to meter 131 through meter 141, using meter 141 as a repeater.

Communication links 104-106 may be wireless or wired links. For example, it may be desirable to provide low cost wireless communication techniques for communication links 105 and 106, as on-site locations 120, 130, and 140 tend to be in relatively closer proximity to each other. Also, for example, it may be desirable to provide a wired communication technique for communication link 104, as remote location 110 tends to be a relatively greater distance from on-site location 120 with data collector/meter 121. Because the availability of on-site location 120 with data collector/meter 121 limits the number of longer distance links with remote location 110, the often more reliable wired communication techniques may be a cost effective solution for communication link 104. However, it should be appreciated that the invention contemplates communication links 104-106 being either wired or wireless in any combination. For example, communication links 104-106 are not limited to any network configuration, but may include any of the following techniques: Local Area Network (LAN), Wide Area Network (WAN), Ethernet, Digital Subscriber Lines (DSL), and/or coaxial cable network, for example. In addition, communication links 104-106 may employ secure communication methods including, for example, digital encryption and/or digital signature techniques well known to those skilled in the art.

Also, it should be appreciated that the formatting of the communicated data over communication links 104-106 may be in any desirable format including transmission control protocol/internet protocol (TCP/IP), electronic messaging format, extensible markup language (XML), Institute of Electrical/Electronic Engineers (IEEE) Standard 802.11, Bluetooth™, and X10™, and ANSI C12.21 Remote Communication Protocol, for example, to communicate data between data collector/meter 121 and remote location 110.

Data Collector/Meter

Data collector/meter 121 may be an A3 Alpha™ meter available from ABB Inc. The A3 Alpha™ meter may be modified to include one or more network communication option boards including a WAN option board for communication link 104 and a LAN Option Board (LANOB) for communication links 105, 106, etc. An example embodiment may use a Plain Old Telephone Service (POTs) modem option board for the wired WAN and a 900 MHz radio option board for the wireless LAN.

By serving as a central point of communication between remote location 110 and any number of on-site locations 130 and 140, data collector/meter 121 serves to reduce the overall complexity and corresponding cost of AMR system 100. For example, the ability of data collector/meter 121 to act as a gateway between remote location 110 and on-site locations 130 and 140, while data collector/meter 121 retains its operation as an electrical power meter, reduces the need for additional networking equipment. Also, because data collector/meter 121 centralizes some of the intelligence and functionality found in higher cost meters, meters 131 and 141 may be lower cost meters capable of engaging in two-way communication with data collector/meter 121.

Figure 2:
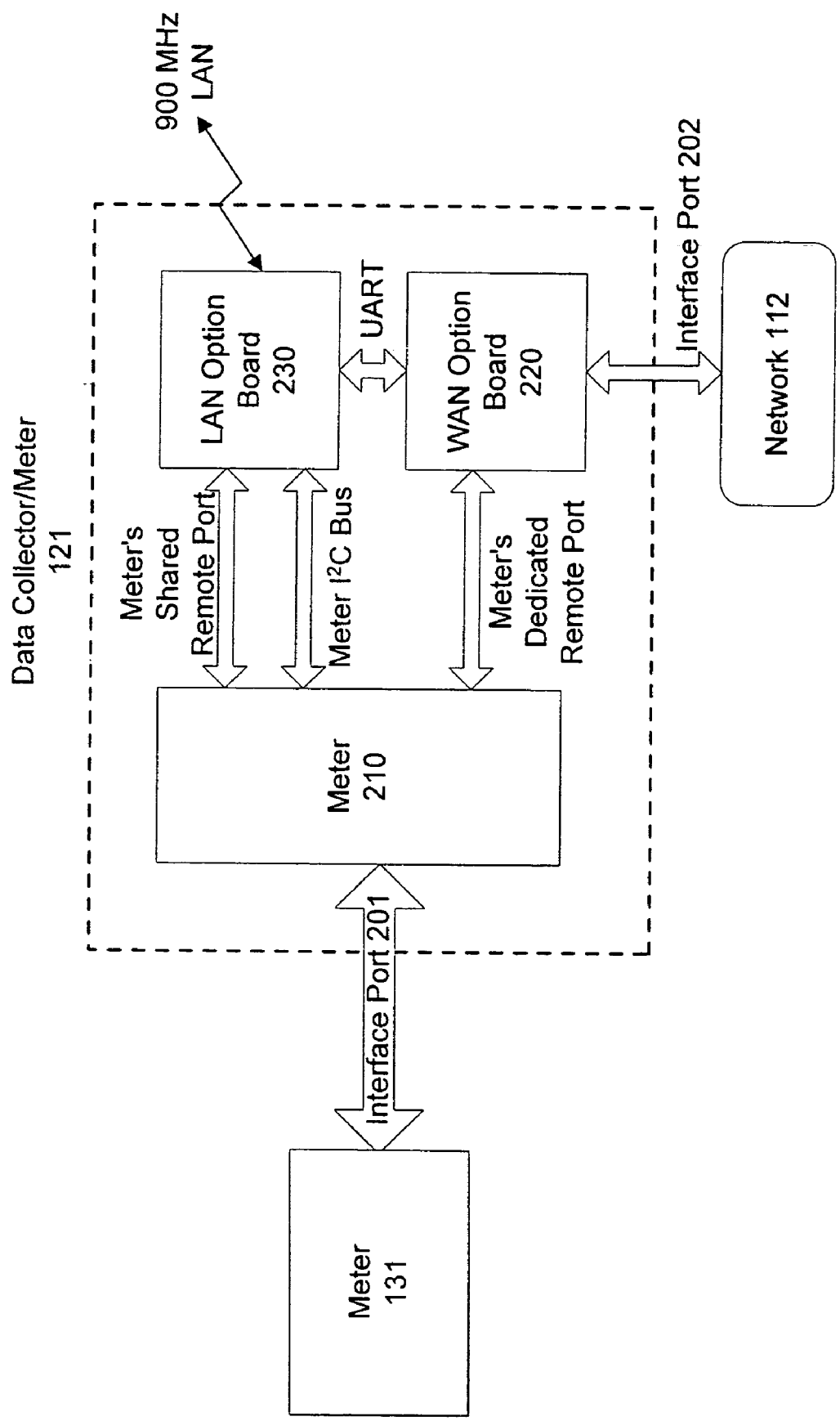
FIG. 2 is a block diagram of a data collector/meter, according to the invention.

FIG. 2 provides a block diagram further detailing one example of a data collector/meter 121. Although certain components are designated and discussed with reference to FIG. 2, it should be appreciated that the invention is not limited to such components. In fact, various other components typically found in an electronic meter will be a part of data collector/meter 121, but have not been shown in FIG. 2 for the purposes of clarity and brevity. Also, the invention may use other components to accomplish the operation (as will be discussed) of data collector/meter 121. The components that are shown and the functionality described for data collector/meter 121 are provided as examples, and are not meant to be exclusive of other components or other functionality.

As shown in FIG. 2, data collector/meter 121 may include a meter 210 (e.g., an A3 Alpha™ meter available from ABB Inc.) a WAN Option Board 220 (e.g., a telephone modem) and a LAN Option Board 230 (e.g., a 900 MHz radio). WAN Option board 220 routes messages from network 112 (via interface port 202) to either meter 210 or LAN Option Board 230. LAN Option Board 230 may use a transceiver (not shown), for example a 900 MHz radio, to communicate data to meter 131. Also, LAN Option Board 230 may have sufficient memory to store data from meter 131. This data may include, but is not limited to the following: current billing data (e.g., the present values stored and displayed by meter 131), previous billing period data, previous season data, and load profile data.

LAN Option Board 230 also may communicate via a wired interface (e.g., RS-232) to meter 210. LAN Option Board 230 may be capable of synchronizing its time to a real time clock (not shown) in meter 210 and thereby synchronize the LAN reference time to the time in meter 210. The communication interfaces and the collection and storage of metering data are handled by a computer (not shown) within data collector/meter 121. The computer may include various other components (not shown) including programmable computer memory, databases, timing components (e.g., quartz crystals), application specific (ASIC) hardware circuits, network interface cards, and computer firmware, for example. Generally, the computer includes any computer hardware, software, or firmware needed to satisfy the operation of data collector/meter 121 in AMR system 100.

Figure 7:
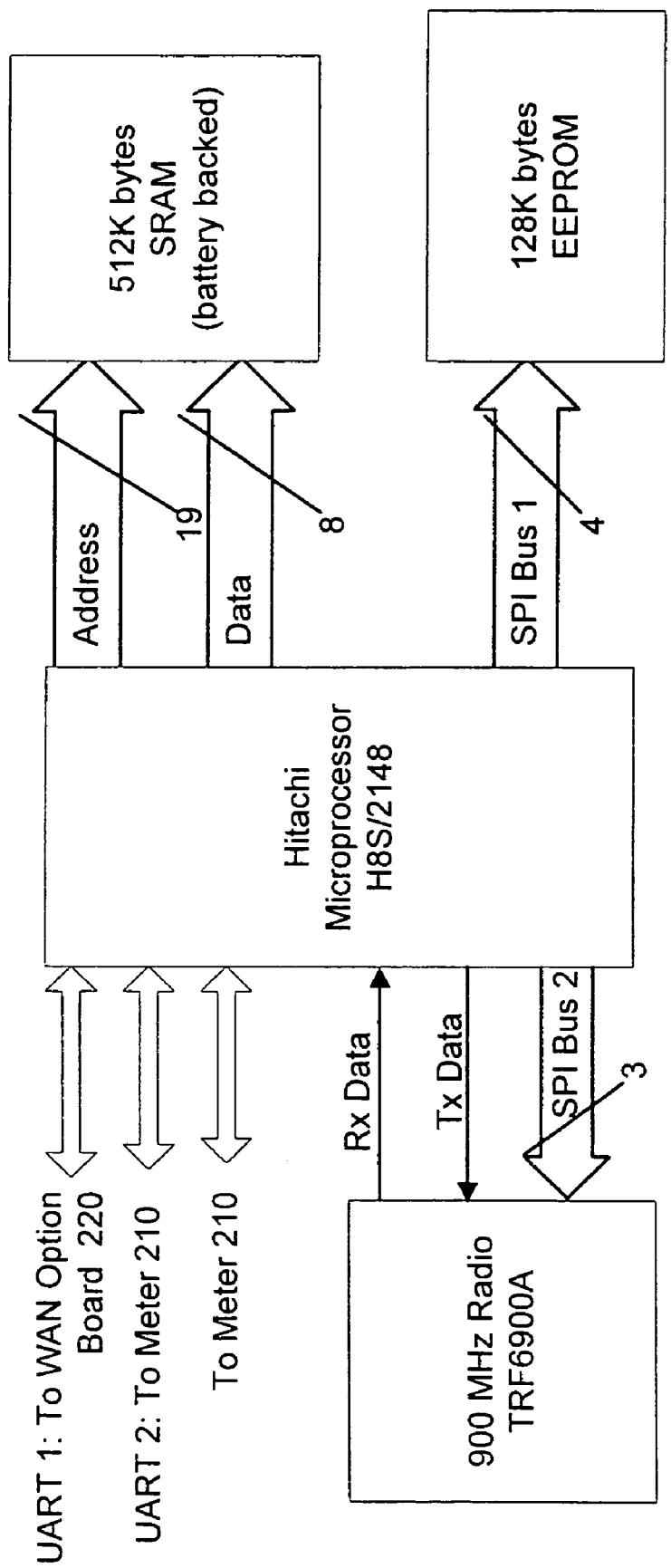
FIG. 7 provides one example of the components that may be included with a LAN Option Board, according to the invention.

FIG. 7 provides one example of the components that may be included with LAN Option Board 230. However, FIG. 7 is not meant to be an exclusive representation of such components or their configurations.

The responsibility of data collector/meter 121 in AMR system 100 is wide and varied. Generally, data collector/meter 121 is responsible for managing, processing and routing data communicated with remote location 110 and on-site locations 130 and 140.

Data collector/meter 121 reads usage data from meter 131 via interface port 201. Meter 131 is generally a less complex device than data collector/meter 121. In order to reduce the cost of AMR system 100, meter 131 may have a computer with equal or less functionality as the computer in data collector/meter 121. In order to provide two-way communication with data collector/meter 121, meter 131 may have a transceiver device similar to the transceiver in data collector/meter 121.

Usage data gathered by meter 131 may be stored within meter 131, or it may be provided immediately to data collector/meter 121. Meter 131 typically has limited storage capacity, and therefore may rely on data collector/meter 121 to periodically read the data before it is overwritten. Meter 131 may store and display the current energy consumption (kWh). Meter 131 also may display the TOU energy consumption and the current peak demand for the billing period. In addition to this current data, meter 131 may store a copy of this data taken at a critical interval, such as the monthly billing date or a season change date.

Data collector/meter 121 may continually or intermittently read the current data from meter 131 and store the data in a database (not shown) in data collector/meter 121. Such current data may include but is not limited to the total kWh usage, the TOU kWh usage, the peak kW demand, and other status information from meter 131. Data collector/meter 121 also may read and store previous billing and previous season data from meter 131 and store the data in the database in data collector/meter 121. Meter 131 may store a smaller quantity of load profile data (e.g., 24 hours of 15 minute data). Data collector/meter 121 may read this data and store several days of profile data, for example, that otherwise may not be able to be stored in the limited memory of meter 131. Whether data collector/meter 121 reads previous billing, previous season, or load profile data from meter 131 is configurable and may vary. Accordingly, the invention is not limited to reading this or any other type of data over any particular interval. When data collector/meter 121 is configured to read and store load profile data, the amount of data stored in data collector/meter 121 is configurable and may vary.

It is well known to those skilled in the art that electrical energy consumption may be measured in any number of ways including: TOU and demand-based reading. TOU-based usage reading refers to the notion of time-stamping the usage of electricity, such that a utility may bill a premium for power used at certain times of the day or year, as compared to other times. For example, in the summer, peak electric power usage times traditionally occur during the late afternoon. Therefore, meter 131 may be equipped to measure the amount of electric power used during these intervals, so that the power usage may be billed differently (and perhaps higher) than at other time intervals.

Demand-based usage readings determine peak power usages for a particular customer. For example, a demand-based usage reading may allow a utility to bill a premium for a customer that uses 20 kWh in a one hour time span, as compared to another customer that uses 20 kWh in a twenty-four hour time span. Because such concentrated electric power usage taxes the utility's power generation plants and distribution system, the customer may be billed at a higher rate.

AMR system 100 may be designed to permit meter 131 to measure usage based on these specific types of usage techniques, for example. Also, data collector/meter 121 may be able to configure meter 131 with specific instructions to accomplish such usage reading techniques. For example, data collector/meter 121 may be designed to instruct meter 131 as to a particular time interval that demand-based data should be captured. When meter 131 is registered with data collector/meter 121, computer servers 111 assign meter 131 to a billing identifier, where the billing identifier defines the billing date for meter 131. Data collector/meter 121 also is programmed by computer server 111 with a calendar of billing dates for each billing identification. It may be the responsibility of data collector/meter 121 to notify meter 131 to store a copy of the current billing data and reset the peak demand at a certain time (e.g., midnight) of the billing date. This process is described in more detail in the following paragraphs.

At a defined time interval (e.g., midnight crossing), data collector/meter 121 checks if the billing date for meter 131 is to occur at the next interval. For example, if the billing date is at the midnight crossing of Jun. 1, 2002, data collector/meter 121 checks to ensure that meter 131 is to perform a demand reset on Jun. 2, 2002. If data collector/meter 121 determines that a billing date should occur within an upcoming period (e.g., within the next 24 hours), data collector/meter 121 provides a message to meter 131 to "arm" and to perform a demand reset at the next midnight crossing (e.g., Jun. 2, 2002). When this midnight crossing occurs, meter 131 stores a copy of the current billing data, increments a demand reset count, where the demand reset count is used to identify the specific instance of billing data. Data collector/meter 121 then resets the current billing data demand value (kW) to start a new billing cycle. After the midnight crossing occurs, data collector/meter 121 reads the billing data copy stored in meter 131 so that it is readily available for retrieval by remote location 110.

Because meter 131 does not typically have a real time clock, if meter 131 were to lose power between the time that it is armed to perform the demand reset and the midnight crossing, it is possible that meter 131 would not properly perform the demand reset at midnight. In addition to reading the billing data copy from meter 131, data collector/meter 121 may continually read the current billing data from meter 131. After meter 131's billing date has occurred, data collector/meter 121 will insure that meter 131 has properly performed a demand reset setting information in the read message that forces meter 131 to perform a demand reset. This is illustrated by the following example.

On Jun. 1, 2002, the demand reset count in meter 131 is 12. Data collector/meter 121 recognizes that meter 131 should perform a demand reset at midnight Jun. 2, 2002, and sends information in the read command to "arm" meter 131 to perform the demand reset. At midnight on Jun. 2, 2002, meter 131 stores a copy of the current billing data, increments the demand reset count to 13 and resets the current peak demand. Subsequent reads from data collector/meter 121 instruct meter 131 to perform a demand reset if the demand reset count in meter 131 is not equal to 13. Since the demand reset count is already equal to 13, meter 131 does not perform another demand reset. However, if meter 131 had missed the midnight crossing due to a power loss, the message from data collector/meter 121 would force meter 131 to immediately store a copy of the billing data and reset demand.

Also, data collector/meter 121 can inform meter 131 of upcoming events, such as day type, season type, etc. In particular, data collector/meter 121 may let meter 131 know if a day type (e.g., holiday) change or season change is upcoming, so as to prevent meter 131 from placing the data in the incorrect billing tier.

With respect to certain TOU-based data collection techniques, data collector/meter 121 may be capable of instructing meter 131 with certain information to facilitate such readings. Meter 131 stores TOU switchpoints for a weekday schedule, a weekend schedule, and two holiday schedules. Data collector/meter 121 is responsible for sending these schedules to meter 131 and updating the schedules when required by time of year changes or emergency conditions. For example, during a change of season (i.e., a time of the year when usage rates are adjusted), data collector/meter 121 may send messages to meter 131 to update the weekday, weekend and holiday switchpoints that define the TOU schedule for the new season.

Similar to the handling of billing dates, data collector/meter 121 has a calendar that defines the season change dates for each TOU identifier, where each meter in the system may be defined to one of several (e.g., 5) TOU identifiers. Data collector/meter 121 checks for season changes in advance (e.g., one day) and typically instructs meter 131 to perform a billing data copy and demand reset some time prior to (e.g., at midnight) the billing date. In addition to handling the demand reset as is done for the billing date, data collector/meter 121 reads the billing data copy from meter 131 and stores it in data collector/meter 121 (e.g., Previous Season Data Table). Data collector/meter 121 may then send messages to meter 131 (e.g., broadcast to all meters associated with the TOU Id) to update the TOU schedules per the new season.

The updating of TOU schedules on season changes events may be accomplished using unicast (i.e., directed to a particular meter) or broadcast techniques (i.e., directed to all of the meters served by the collector).

TOU schedules may be provided by data collector/meter 121 using any number of techniques. For example, data collector/meter 121 may "broadcast" TOU schedules to each of the meters it serves. The TOU schedules may be broadcast along with the standard network reference time signal, discussed above. As such, the TOU schedules may be broadcast intermittently or continuously, as desired by the network configuration. When a new meter enters AMR system 100, data collector/meter 121 may send the new meter a default TOU schedule. Transmission of the TOU schedule to the new meter may be accomplished using individual or broadcast transmission, or both.

Data collector/meter 121 also is responsible for communicating any change of a meter's identification information (e.g., billing identification or TOU identification). For example, if remote location 110 changes a TOU identification that is assigned to meter 131, data collector/meter 121 will conduct a registration procedure (as discussed with reference to FIG. 3) to update the storage in meter 131 that defines the TOU identification.

Generally, although data collector/meter 121 receives the pertinent usage data from meter 131, data collector/meter 121 may not be required to interpret or process such data. In the interest of simplifying data collector/meter 121, certain intelligence and functionality may be placed within the components at remote location 110 (e.g., computer servers 111). For example, data collector/meter 121 may identify data from meter 131 to remote location 110 with a certain alphanumeric code that is understood at remote location 110. Similarly, meter 131 may have multiple data sets, each with a unique identification code provided by data collector/meter 121. In this way, remote location 110 may be responsible for collating and processing the usage data, and data collector/meter 121 may just be responsible for routing the data from meter 131 with the proper identifier. Alternatively, data collector/meter 121 is not so limited, and may accomplish some data interpretation as is necessary.

One particular operation that may be accomplished by data collector/meter 121 is the maintenance, synchronization, and distribution of network time references. Lower cost meters, like meter 131, may not be equipped with a real time clock. As a result, when meter 131 loses power, it will lose its network time reference when power returns. Therefore, data collector/meter 121 may provide network time references to meter 131. In this way, data collector/meter 121 ensures that meter 131 (and any other meters served by data collector/meter 121—e.g., meter 141) is operating on a proper time reference. As described above, for TOU and demand-based based usage measurements, having meter 131 operate on a particular standard time reference ensures that power usage will be billed properly and in accordance with predetermined time-based billing rates.

Providing the proper time standard at the point of data collection (i.e., meter 131), instead of at another point in AMR system 100 (e.g., remote location 110) provides greater synchronization between when a particular quantity of energy was used. Also, allowing data collector/meter 121 to distribute and synchronize time to meter 131 limits the dependence on the often unreliable communication links from remote location 110 to meter 131. In this way, AMR system 100 provides an added level of assurance that a certain quantity of energy was used during the designated time interval; a correlation that is significant to the operation of TOU and demand-based based usage measurement techniques. Also, distributing the time reference from data collector/meter 121 to meter 131 provides additional reliability due to the closer proximity of data collector/meter 121 to meter 131.

In order to facilitate allowing data collector/meter 121 to communicate the proper time reference to each of the meters it servers (e.g., meter 131 and 141), a "broadcast" transmission technique may be employed. The broadcast technique refers to allowing data collector/meter 121 to transmit one time signal to all of the meters that it serves. Where communication links 105 and 106 are wireless, for example, data collector/meter 121 may simply transmit one wireless signal to meters 131 and 141. The time reference signal may be sent at certain intervals (e.g., hourly, daily) or continuously to ensure that the meters served by data collector/meter 121 receive the time reference signal.

Data collector/meter 121 may be responsible for registering and identifying particular meters on AMR system 100. Such registration may occur, for example, when a new meter is added to AMR system 100, when a new collector is added, and/or when an existing meter determines that it will be best served by another (perhaps closer in proximity) collector. In fact, in maintaining AMR system 100, data collector/meter 121 allows meters 131 and 141 to switch from data collector/meter 121 to a different collector (not shown). In order to ensure that data is not lost during the collector transition, both data collector/meter 121 and the new collector may retrieve information from the switching meter, as will be discussed. Also, the old collector (i.e., the collector from which the meter has transitioned) will store the data from the meter before it switches to the new collector. Such data may be stored in a table called "Old Node Data Log." By storing the data in such a log, the system is ensured of collecting the data from the switching meter, in case the data is lost when the meter switches to the new collector.

Figure 3:
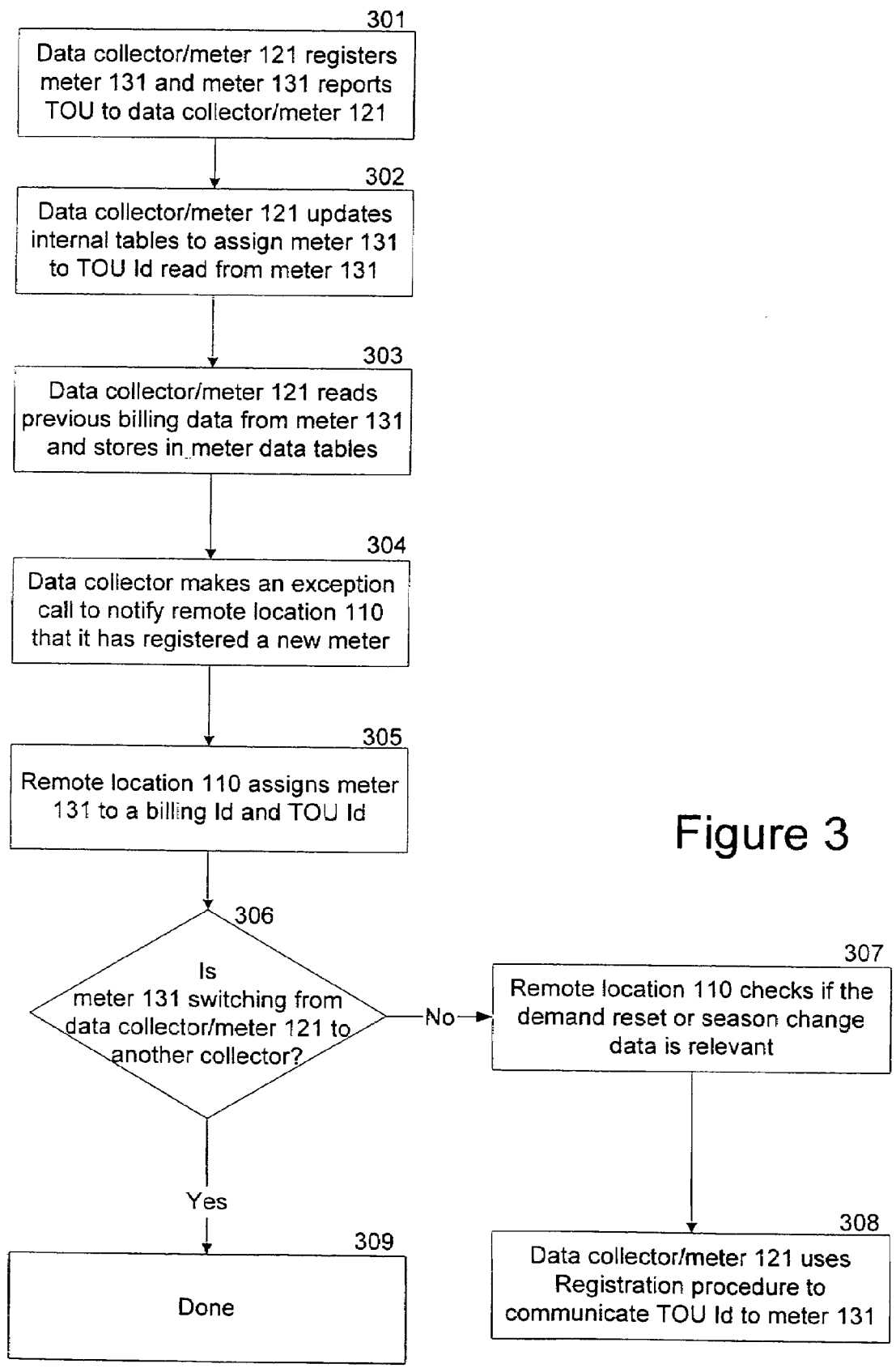
FIG. 3 is a flow diagram of a method of selling access to data captured by the power meter on the Internet, according to the invention.

FIG. 3 provides a flow diagram describing the method by which data collector/meter 121 registers meter 131. In step 301, data collector/meter 121 finds and registers meter 131 and reads the TOU Id from meter 131. When initially installed, meter 131 will have a default TOU Id. If meter 131 had previously been registered to a different collector, the TOU Id read by data collector/meter 121 would be the id assigned by the old data collector/meter. In step 302, data collector/meter 121 updates its internal data tables to list meter 131 and assign it to the TOU Id read from meter 131. In step 203, data collector/meter 121 reads the previous billing data from meter 131 and stores the data in data collector/meter 121. For example, data may be stored in a "Previous Billing Data Table" and a "Previous Season Data Table." In step 304, data collector/meter 121 may make an exception call to remote location 110 to inform computer servers 111 indicating that it has registered a new meter (e.g., meter 131). In step 305, remote location 110 assigns meter 131 to a billing id and a TOU Id.

In step 306, it is determined whether meter 131 had previously been registered with a different collector. If meter 131 had previously been registered with a different collector, the TOU Id would have been set in meter 131 and would typically be set correctly in data collector/meter 121, and the process is done in step 309. Transferring the TOU Id to the new collector prevents meter 131 from reverting to a default TOU Id, which would likely cause meter 131 to use an incorrect TOU schedule and store data in the incorrect TOU billing locations or "buckets."

The billing id may be assigned by remote location 110 and updated in data collector/meter 121. The billing id may be stored in data collector/meter 121 and may be used to determine the date that data collector/meter 121 communicates a demand reset message to meter 131. Until updated by remote location 110, data collector/meter 121 assigns meter 131 to billing id 0. A billing date for this id is not defined, which means that data collector/meter 121 may not tell meter 131 to perform a demand reset. This mechanism prevents data collector/meter 121 from telling meter 131 to perform a demand reset on the incorrect billing date.

If it is determined in step 306 that meter 131 is not switching from data collector/meter 121 to another collector, in step 307, remote location 110 ensures that the demand reset or previous billing data from meter 131 stored in data collector/meter 121 is relevant data that has not yet been read by remote location 110. The demand reset count read from meter 131 is used by remote location 110 to determine if the data is previous billing or previous season data.

In step 308, the data collector/meter uses a Registration Procedure to communicate the assigned TOU Id to meter 131. Meter 131 uses the TOU Id to store the correct TOU schedules.

Data collector/meter 121 also may be designed to gather load profile data from any configurable set of meters. In particular, because as discussed, meter 131 may be capable of storing a certain interval of data (e.g., data collected over a 24-hour period), data collector/meter 121 may be variably configured to retrieve the stored load profile data over a group of meters. For example, the number of meters profiled by data collector/meter 121 and the amount of data stored for each meter may be configured within data collector/meter 121.

In just one embodiment, for example, data collector/meter 121 could be configured to store data for fifty meters having forty days of stored data for each meter. In another embodiment, for example, data collector/meter 121 could be configured to store data for five hundred meters having four days of stored data for each meter. FIG. 4 provides an example of a load profile table that is capable of storing 13 intervals of data. Data collector/meter 121 may be configured to read the load profile data from meters 131 and 141 frequently enough to ensure that there is no data lost in the transmission. Data collector/meter 121 may read the similar interval data multiple times, but it only appends new data to the existing data in the collector database.

In addition to dynamically allocating the amount of memory used to collect load profile data, the number of meters for which data collector/meter 121 stores basic data (e.g., current billing data, previous billing data, and previous season data) is configurable. Changing the number of meters supported changes the amount of memory available for load profile. A data collector may support, for example more than 500 meters, but any number of meters may be supported. To increase the amount of memory available for load profile data, the data collector could be configured to only store data for 250 meters, for example.

Data collector/meter 121 also permits remote location 110 to direct specific real-time commands to meter 131. For example, if certain emergency conditions exist (e.g., rolling brownout or blackout), the utility may desire to modify a TOU schedule on a short-term basis. Also, short-term TOU schedule adjustments may be desirable for certain extreme weather conditions (e.g., hottest or coldest days). AMR system 100 permits data collector/meter 121 to send instructions to meter 131 to conduct a temporal "override" of the set TOU schedule. When the interval for the override expires, meter 131 is directed to return to the set TOU schedule. For example, data collector/meter 121 may direct meter 131 to bill at a higher rate tomorrow from 4 pm to 6 pm, due to expected weather conditions. At 6 pm, meter 131 may be directed to resume normal TOU scheduling.

Data collector/meter 121 may accomplish such short-term override of TOU schedule on a broad basis by using a broadcast transmission procedure to all of its served meters. Such messaging may be carried further to alert the customer premise of the impending TOU schedule change, so as to counteract the increased billing rate and promote lower energy usage. For example, meter 131 may send a message to a unit within the customer premise (e.g., an electronic thermostat) to increase the energy usage during the lower billing period, and decrease the energy usage during the higher billing period.

Similar to short-term overrides of TOU schedules, data collector/meter 121 may accomplish on-demand reads and writes with meter 131. For example, the utility may desire certain usage data immediately over a range of meters, or all data from a particular meter. Data collector/meter 121 accommodates such on-demand reads. Also, on-demand writes from data collector/meter 121 to meter 131 may be desired. For example, if a customer desires to change its billing schedule/date or TOU schedule/rate, a utility's customer service can initiate a write to meter 131 via data collector/meter 121 as the customer is on the telephone making the request. Such on-demand reads and writes may be conducted directly by remote location 110 to a particular meter, using a "pass through" procedure, where data collector/meter 121 simply routes the request to meter 131.

Data collector/meter 121 also provides support for certain special requests from remote location 110. For example, if remote location 110 wants certain meter data (e.g., meters with billing dates on a certain date, or get previous season data for all the meters that changed seasons), data collector/meter 121 supports filtered requests. Such filtered data requests can request data from all meters, a particular meter, all meters associated with a particular billing identification, and/or all meters associated with a particular TOU identification, for example. Also, specific data-based based filters may be applied to the request. For example, a filter may provide only report data for a meter if the meter's data is out of date by a certain number of hours.

Illustrative Computing Environment for Automated Meter Reading System

Figure 5:
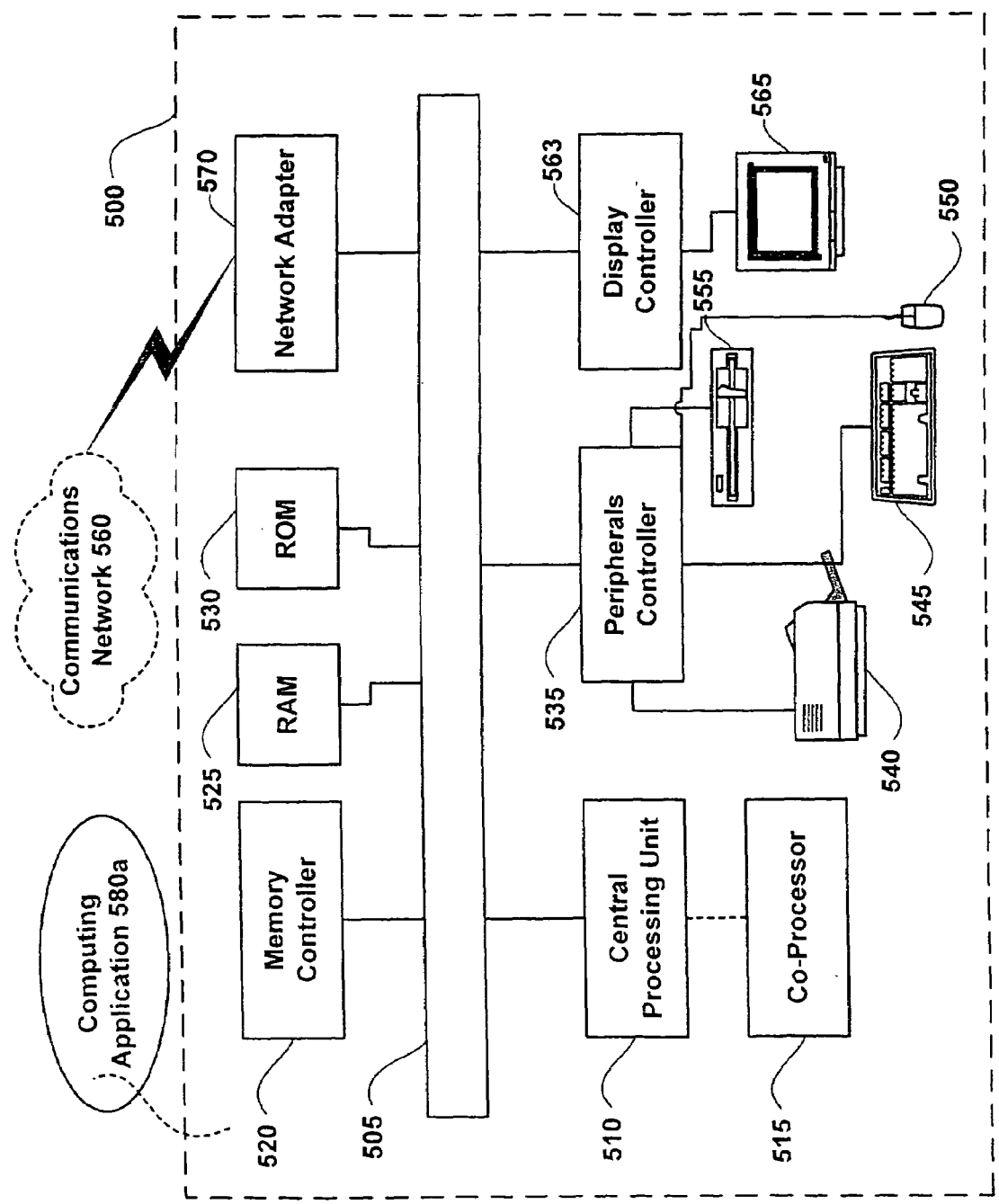
FIG. 5 provides an example of a computing system, according to the invention.

FIG. 5 depicts an exemplary computing system 500 in accordance with the invention. Portions of computing system may be a part of computer 203 in data collector/meter 121. Computing system 500 is capable of executing a computing application 580*a* that allows users to gain access to data access files, for example. Example computing system 500 is controlled primarily by computer-readable instructions, which may be in the form of software, hardware, and/or firmware, wherever, or by whatever means such software is stored or accessed. Such software may be executed within central processing unit (CPU) 510 to cause data processing system 500 to do work. In many known workstations and personal computers, central processing unit 510 is implemented by a single-chip CPU called a microprocessor. Coprocessor 515 is an optional processor, distinct from main CPU 510 that performs additional functions or assists CPU 510. One common type of coprocessor is the floating-point coprocessor, also called a numeric or math coprocessor, which is designed to perform numeric calculations faster and better than general-purpose CPU 510. Recently, however, the functions of many coprocessors have been incorporated into more powerful single-chip microprocessors.

In operation, CPU 510 fetches, decodes, and executes instructions, and transfers information to and from other resources via the computer's main data-transfer path, system bus 505. Such a system bus connects the components in computing system 500 and defines the medium for data exchange. System bus 505 typically includes data lines for sending data, address lines for sending addresses, and control lines for sending interrupts and for operating the system bus. An example of such a system bus is the PCI (Peripheral Component Interconnect) bus. Some of today's advanced busses provide a function called bus arbitration that regulates access to the bus by extension cards, controllers, and CPU 510. Devices that attach to these busses and arbitrate to take over the bus are called bus masters. Bus master support also allows multiprocessor configurations of the busses to be created by the addition of bus master adapters containing a processor and its support chips.

Memory devices coupled to system bus 505 include random access memory (RAM) 525 and read only memory (ROM) 530. Such memories include circuitry that allows information to be stored and retrieved. ROMs 530 generally contain stored data that cannot be modified. Data stored in RAM 525 can be read or changed by CPU 510 or other hardware devices. Access to RAM 525 and/or ROM 530 may be controlled by memory controller 520. Memory controller 520 may provide an address translation function that translates virtual addresses into physical addresses as instructions are executed. Memory controller 520 also may provide a memory protection function that isolates processes within the system and isolates system processes from user processes. Thus, a program running in user mode can access only memory mapped by its own process virtual address space; it cannot access memory within another process's virtual address space unless memory sharing between the processes has been established.

In addition, computing system 500 may contain peripherals controller 535 responsible for communicating instructions from CPU 510 to peripherals, such as, printer 540, keyboard 545, mouse 550, and disk drive 555. Disk drive 555 may be a hard-drive device, for example.

Display 565, which is controlled by display controller 560, is used to display visual output generated by computing system 500. Such visual output may include text, graphics, animated graphics, and video. Display 565 may be implemented with a CRT-based video display, an LCD-based flat-panel display, gas plasma-based flat-panel display, or a touch-panel. Display controller 563 includes electronic components required to generate a video signal that is sent to display 565.

Further, computing system 500 may contain network adapter 570, which may be used to connect computing system 500 to an external communication network 560. Communications network 560 may provide computer users with techniques for communicating and transferring software and information electronically. Additionally, communications network 560 may provide distributed processing, which involves several computers and the sharing of workloads or cooperative efforts in performing a task. It will be appreciated that the network connections shown are examples and other means of establishing a communications link between the computers may be used.

Illustrative Computer Network Environment for Automated Meter Reading System

Figure 6:
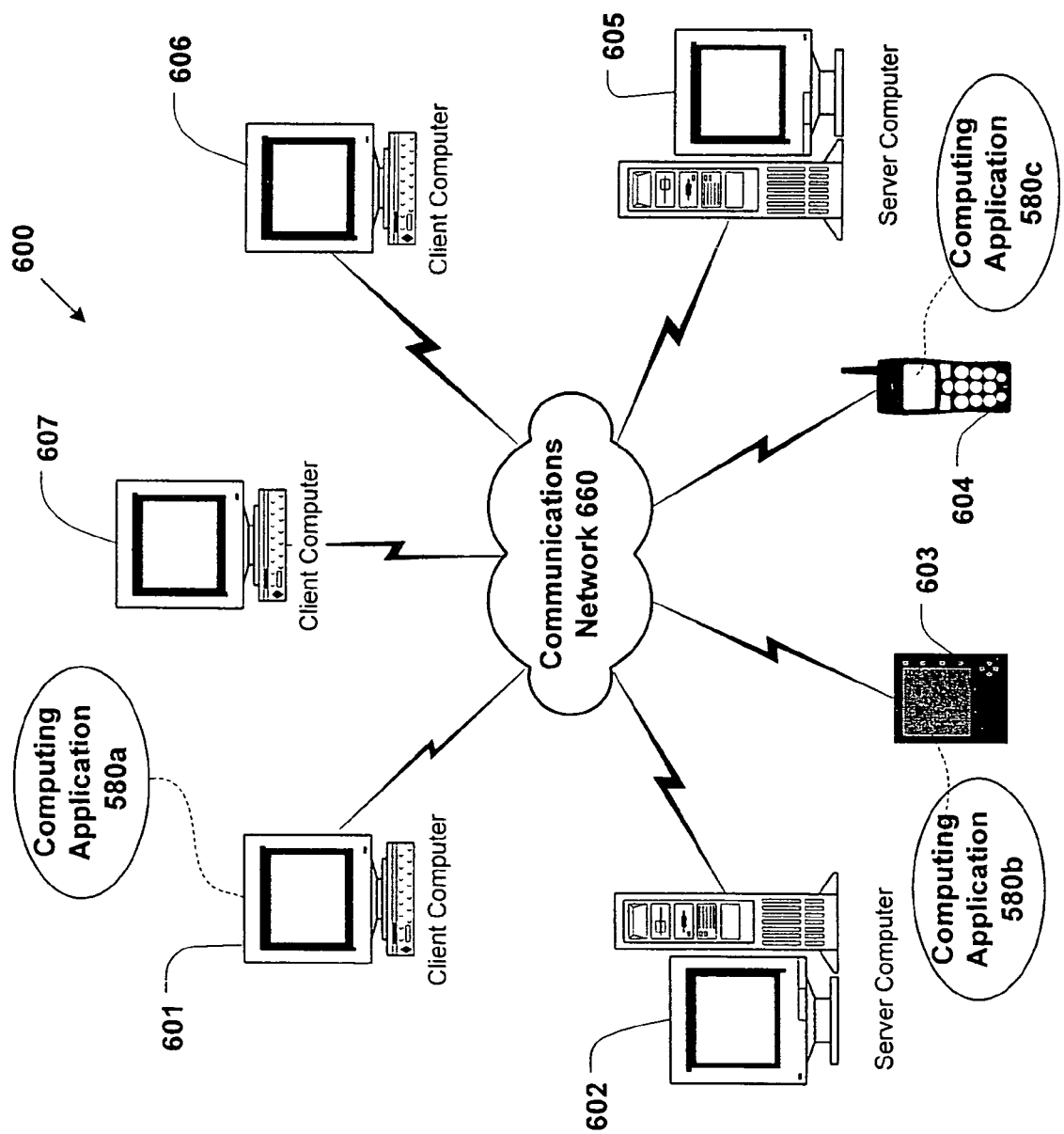
FIG. 6 illustrates an example of a network environment, with a server computer in communication with client computers via a communications network, in which the invention may be employed.

As noted above, the computer described with respect to FIG. 5 can be deployed as part of a computer network. In general, the above description applies to both server computers and client computers deployed in a network environment. FIG. 6 provides an example of a network environment 600, with a server computer 602, 605 in communication with client computers 601, 606, 607 via a communications network 660, in which the invention may be employed.

As shown in FIG. 6, a number of servers 602, 605 are interconnected via a communications network 660 (which may be a LAN, WAN, intranet or the Internet, for example) with a number of client computers 601, 606, 607, or computing devices, such as, mobile phone 601 and personal digital assistant 603. In a network environment in which the communications network 660 is the Internet, for example, the servers 602, 605 can be Web servers with which the clients 601, 606, 607 communicate via any of a number of known protocols, such as, hypertext transfer protocol (HTTP) or wireless application protocol (WAP), as well as other innovative communication protocols. Each client computer 601, 606, 607 can be equipped with computing application 580*a* to gain access to the servers 602, 605. Similarly, personal digital assistant 603 can be equipped with computing application 580*b* and mobile phone 604 can be equipped with computing application 580*c* to display and receive various data. It should also be appreciated that personal digital assistant 603 and mobile phone 604 may be used to request access and/or data from servers 602, 605.

The invention is directed to a system, method, and metering device communicating data in an automated meter reading system. The invention was described in the context of wired and wireless data communication system, but is not so limited to, regardless of any specific description in the drawing or examples set forth herein. For example, the invention may be applied to non-traditional networks like Voice-over-IP-based networks, or virtual private networks, for example. Also, although the invention was described in the context of electrical power meters, it should be appreciated that the invention applies equally to communications with any type of service meter, including water and gas meters, for example. Also, the format and protocols used by the data files are not limited to any particular type.

It will be understood that the invention is not limited to use of any of the particular components or devices herein. Indeed, this invention can be used in any application that requires controlling access to data captured by an electric power meter. Further, the system disclosed in the invention can be used with the method of the invention or a variety of other applications.

While the invention has been particularly shown and described with reference to the embodiments thereof, it will be understood by those skilled in the art that the invention is not limited to the embodiments specifically disclosed herein. Those skilled in the art will appreciate that various changes and adaptations of the invention may be made in the form and details of these embodiments without departing from the true spirit and scope of the invention as defined by the following claims.

What is claimed is:

1. A data collector, comprising:
   an electronic utility meter that collects and stores billing data related to a commodity consumption; and
   a network communication device for communicating with downstream utility meters and to a remote location that processes said billing data,
   wherein said data collector communicates wirelessly with said downstream utility meters to read and store billing data contained in said downstream utility meters,
   wherein said data collector communicates said billing data to said remote location for processing,
   wherein said data collector commands said downstream utility meters to perform billing-related functions, and
   wherein said data collector notifies said downstream utility meters to store a copy of current billing data and reset a peak demand at a predetermined time.

2. The data collector of claim 1 wherein, said billing-related functions comprise at least one of storing said billing data, conducting a demand reset, setting a time-of-use schedule (TOU), and changing TOU season schedules.

3. The data collector of claim 1, wherein said data collector commands said downstream utility meters to perform said billing-related functions immediately or at a scheduled time.

4. The data collector of claim 1, wherein said data collector determines if said downstream utility meters have performed said reset of said peak demand.

5. The data collector of claim 1, wherein said network communication device comprises a WAN option board for communicating to said remote location and a LAN option board for communicating to said downstream utility meters.

6. The data collector of claim 1, wherein said data collector routes data between said downstream utility meters and said remote location.

7. The data collector of claim 6, wherein said data collector communicates a time reference to said downstream utility meters.

8. The data collector of claim 6, wherein said data collector registers said downstream utility meters into a sub-net of utility meters that communicate to said data collector.

9. A method of providing a utility meter in a data collector, comprising:
    collecting and storing billing data related to a commodity consumption;
    communicating wirelessly with downstream utility meters to read and store billing data contained in said downstream utility meters;
    communicating said billing data to said remote location for processing;
    commanding said downstream utility meters to perform billing-related functions;
    notifying said downstream utility meters to store a copy of current billing data; and
    resetting a peak demand at a predetermined time.

10. The method of claim 9, wherein said billing-related functions comprise at least one of storing said billing data, conducting a demand reset, setting a time-of-use schedule (TOU), and changing TOU season schedules.

11. The method of claim 9, wherein said downstream utility meters are commanded to perform said billing-related functions immediately or at a scheduled time.

12. The method of claim 9, further comprising:
    determining if said downstream utility meters have performed said reset of said peak demand.

13. The method of claim 9, said data collector comprising a network communication board comprising a WAN option board for communicating to said remote location and a LAN option board for communicating to said downstream utility meters.

14. The method of claim 9, further comprising:
    routing data between said downstream utility meters and said remote location.

15. The method of claim 14, further comprising:
    communicating a time reference to said downstream utility meters.

16. The method of claim 14, further comprising:
    registering said downstream utility meters into a sub-net of utility meters that communicate to said data collector.

* * * * *

UNITED STATES PATENT AND TRADEMARK OFFICE
CERTIFICATE OF CORRECTION

PATENT NO. : 7,312,721 B2
APPLICATION NO. : 10/953847
DATED : December 25, 2007
INVENTOR(S) : Mason, Jr. et al.

Page 1 of 1

It is certified that error appears in the above-identified patent and that said Letters Patent is hereby corrected as shown below:

On the title page,

[*] Notice: Subject to any disclaimer, the term of this patent is extended or adjusted under 35 USC 154(b) by (293) days Delete the phrase "by 293 days" and insert -- by 237 days --

Signed and Sealed this

Fifteenth Day of April, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,312,721 B2 | Page 1 of 1 |
| APPLICATION NO. | : 10/953847 | |
| DATED | : December 25, 2007 | |
| INVENTOR(S) | : Robert T. Mason, Jr. | |

It is certified that error appears in the above-identified patent and that said Letters Patent is hereby corrected as shown below:

Title page, Item (63), delete "10/185,664, filed on June 27, 2002, now Pat. No. 7,119,713" and substitute therefore --10/185,074, filed June 28, 2002--

At COL. 1, directly under CROSS-REFERENCE TO RELATED APPLICATIONS, at line 7, add the following paragraph:

--This application is a continuation of U.S. Patent Application No. 10/185,074, filed June 28, 2002, and entitled "Data Collector For An Automated Meter Reading System," the contents of which are hereby incorporated by reference in their entirety.--

Signed and Sealed this

Second Day of June, 2009

JOHN DOLL
*Acting Director of the United States Patent and Trademark Office*